(12) United States Patent
Bhattacharya

(10) Patent No.: US 11,824,998 B2
(45) Date of Patent: *Nov. 21, 2023

(54) SYSTEM AND METHOD FOR SOFTWARE MODULE BINDING

(71) Applicant: Visa International Service Association, San Francisco, CA (US)

(72) Inventor: Soumendra Bhattacharya, Union City, CA (US)

(73) Assignee: Visa International Service Association, San Francisco, CA (US)

( * ) Notice: Subject to any disclaimer, the term of this patent is extended or adjusted under 35 U.S.C. 154(b) by 231 days.

This patent is subject to a terminal disclaimer.

(21) Appl. No.: 17/242,705

(22) Filed: Apr. 28, 2021

(65) Prior Publication Data

US 2021/0250185 A1    Aug. 12, 2021

Related U.S. Application Data

(63) Continuation of application No. 16/608,626, filed as application No. PCT/US2017/031430 on May 5, 2017, now Pat. No. 11,018,880.

(Continued)

(51) Int. Cl.
*H04L 9/32*      (2006.01)
*G06F 21/60*     (2013.01)
(Continued)

(52) U.S. Cl.
CPC .......... *H04L 9/3271* (2013.01); *G06F 21/602* (2013.01); *H04L 9/0897* (2013.01);
(Continued)

(58) Field of Classification Search
CPC ... H04L 9/3271; H04L 9/3273; H04L 9/0869; G06F 21/12; G06F 21/14; G06F 21/602; G06F 21/445
(Continued)

(56) References Cited

U.S. PATENT DOCUMENTS 7,693,286 B2 * 4/2010 Sutton, II ............... H04L 9/3236
                                                        713/168
9,529,733 B1 * 12/2016 Sokolov ................. H04L 9/0825
(Continued)

FOREIGN PATENT DOCUMENTS

CN    102947795 A    2/2013
CN    103733591 A    4/2014
(Continued)

OTHER PUBLICATIONS

Application No. EP22181572.3, Extended European Search Report, dated Sep. 26, 2022, 10 pages.
(Continued)

*Primary Examiner* — Samson B Lemma
(74) *Attorney, Agent, or Firm* — Kilpatrick Townsend & Stockton LLP

(57) ABSTRACT

Embodiments of the invention are directed to methods and systems for software module binding. Cryptographic keys and challenge elements can be exchanged between a first software module and a second software module to create a binding between the first software module and the second software module. As a result, a first software module can securely and authentically access sensitive data and functionality at a second software module, while unauthorized software modules can be prevented from accessing the sensitive data and functionality.

20 Claims, 9 Drawing Sheets

Related U.S. Application Data

(60) Provisional application No. 62/500,701, filed on May 3, 2017.

(51) Int. Cl.
*H04L 9/08* (2006.01)
*H04L 9/30* (2006.01)

(52) U.S. Cl.
CPC .......... *H04L 9/3073* (2013.01); *H04L 9/3234* (2013.01); *H04L 9/3247* (2013.01); *H04L 9/3297* (2013.01)

(58) Field of Classification Search
USPC .......................................... 713/171, 168–169
See application file for complete search history.

(56) References Cited

U.S. PATENT DOCUMENTS

| | | | | |
|---|---|---|---|---|
| 11,210,412 | B1* | 12/2021 | Ghetti ................... | H04L 63/083 |
| 2003/0051156 | A1* | 3/2003 | Razdan ............... | H04L 63/0428 |
| | | | | 726/4 |
| 2006/0013400 | A1* | 1/2006 | Sutton, II .............. | H04L 9/0897 |
| | | | | 380/278 |
| 2007/0118875 | A1* | 5/2007 | Chow .................. | H04L 63/0846 |
| | | | | 726/2 |
| 2007/0179905 | A1* | 8/2007 | Buch ..................... | H04L 51/212 |
| | | | | 705/75 |
| 2009/0024943 | A1* | 1/2009 | Adler ................. | G06Q 30/0601 |
| | | | | 715/764 |
| 2009/0092248 | A1* | 4/2009 | Rawson ................. | G06F 21/88 |
| | | | | 713/169 |
| 2010/0161966 | A1* | 6/2010 | Kwon ................... | H04L 9/3273 |
| | | | | 380/278 |
| 2012/0045057 | A1* | 2/2012 | Brown .................. | H04L 9/3236 |
| | | | | 380/255 |
| 2012/0057702 | A1 | 3/2012 | Minematsu | |
| 2013/0111211 | A1 | 5/2013 | Winslow et al. | |
| 2014/0064480 | A1* | 3/2014 | Hartley ................. | H04L 9/0877 |
| | | | | 380/30 |
| 2015/0088754 | A1 | 3/2015 | Kirsch | |
| 2016/0092871 | A1* | 3/2016 | Gordon ............. | G06Q 20/3221 |
| | | | | 705/44 |
| 2016/0140546 | A1 | 5/2016 | Taratine et al. | |
| 2016/0191236 | A1* | 6/2016 | Smirnoff ............... | H04L 9/0822 |
| | | | | 713/171 |
| 2018/0167748 | A1* | 6/2018 | Vendelbo ............. | H04R 25/604 |
| 2019/0036681 | A1* | 1/2019 | Sundaresan ............... | H04L 9/14 |

FOREIGN PATENT DOCUMENTS

| | | |
|---|---|---|
| WO | 2016141386 | 9/2016 |
| WO | 2016145377 | 9/2016 |
| WO | 2017040173 | 3/2017 |

OTHER PUBLICATIONS

Application No. EP17908684.8, Extended European Search Report, dated Mar. 16, 2020, 10 pages.
PCT/US2017/031430, "PCT Search Report", dated Jan. 25, 2018, 9 pages.
U.S. Appl. No. 16/608,626, Non-Final Office Action, dated Sep. 25, 2020, 27 pages.
U.S. Appl. No. 16/608,626, Notice of Allowance, dated Jan. 28, 2021, 13 pages.
Application No. CN201780090344.8, Office Action, dated Dec. 22, 2022, 18 pages.
Application No. CN201780090344.8, Notice of Decision to Grant, dated May 10, 2023, 4 pages.

\* cited by examiner

SYSTEM AND METHOD FOR SOFTWARE MODULE BINDING

CROSS-REFERENCES TO RELATED APPLICATIONS

This application is a continuation of U.S. Ser. No. 16/608,626, filed internationally May 5, 2017, which is a 35 U.S.C. 371 patent application which claims priority to PCT Application No. PCT/US2017/031430, with an international filing date of May 5, 2017, which is a non-provisional application of and claims the benefit of the filing date of U.S. Provisional Application No. 62/500,701, filed on May 3, 2017, which are herein incorporated by reference in their entirety for all purposes.

BACKGROUND

Encryption keys are often stored on computing devices for various tasks such as secure communication, identity verification (e.g., via digital signatures), and unique code generation. For example, a mobile device can use an encryption key (alternatively referred to as a decryption key if it is a symmetric key) to decrypt encryption key that is used to generate a cryptogram for a mobile transaction. These keys can be targeted by malware for copying and misuse. Accordingly, there is a need for systems that better protect sensitive data such as encryption keys from being stolen and misused.

Embodiments of the present invention address these problems and other problems, individually and collectively.

SUMMARY

Embodiments of the invention provide a process for binding a first software module with a second software module. Through the exchange of encryption or decryption keys, challenge values, and application identifiers, the first software module and second software module can reliably and repeatedly authenticate one another and securely invoke functionality that might involve the use of sensitive data.

In some embodiments, the binding can be hardware-backed by storing binding information and sensitive data in secure hardware. For example, the second software module can store encryption or decryption keys, challenge values, and other suitable information in a secure element. Binding and security can also be improved through software-based protection, such as obfuscation, guards, and whiteboxing.

To initially establish binding between a first software module (e.g., an application) and a second software module (e.g., a keystore), a binding algorithm can be executed at initialization of the application to exchange identification information, keys, and/or challenge values between the software modules. For example, the second software module can provide a challenge value to the first software module. Thereafter, during runtime execution of the application, data exchanged between the software modules can be encrypted using a data encryption key derived based on the challenge value generated during initialization of the application. Additionally, this challenge value can be replaced during each communication, such that each subsequent communication uses a new challenge value and therefore a new encryption key.

One embodiment of the invention is directed to a method. The method comprises generating, by the first software module, a challenge request comprising data elements including a first software module identifier and a time period; encrypting, by the first software module, using a first challenge element, the data elements in the challenge request; providing, by the first software module, the challenge request to a second software module; decrypting, by the second software module, the data elements in the challenge request; verifying, by the second software module, the data elements; generating, by the second software module, a second challenge element; encrypting, by the second software module, the second challenge element; providing, by the second software module to the first software module, a challenge response including the encrypted second challenge element; decrypting, by the first software module, the encrypted second challenge element; and storing, by the first software module, the second challenge element.

Another embodiment of the invention is directed to a computing device comprising a processor, a first software module, and a second software module configured to perform the above-described method.

Further details regarding embodiments of the invention can be found in the Detailed Description and the Figures.

DETAILED DESCRIPTION

Figure 1:
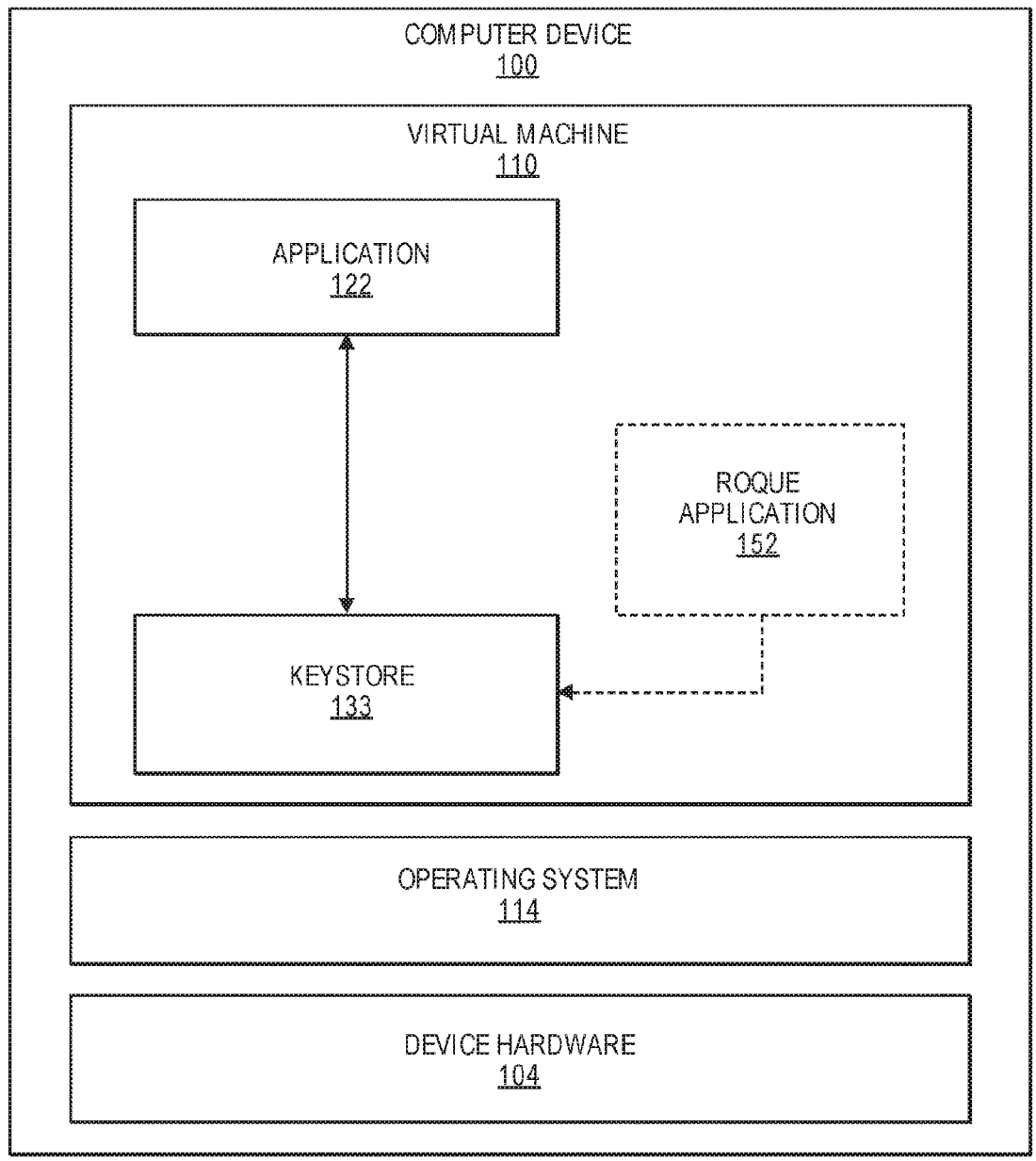
FIG. 1 illustrates a block diagram of a computing device, according to some embodiments.

Embodiments of the invention are directed to binding software modules in a computing device. For example, a first software module can be bound with a second software module. This binding can enable the second software module to securely identify the first software module and determine whether the first software module is authorized to access certain restricted data (e.g., an encryption or decryption key) and/or restricted processes (e.g., cryptogram generation or decryption).

To mitigate against vulnerabilities at the software module interface, each software module can be authenticated to each other to assure that functions in a software module are being called by a known entity or known software component, and that the caller is authorized to invoke the called function. The data passed back and forth between the software modules can also be encrypted to stay opaque to any man-in-the-middle eavesdropping on the data exchange to assure data confidentiality and integrity.

According to some embodiments, during the first time initialization of a first software module (e.g., when a software application is first compiled and installed on a device, or the first time that the software application is executed), the software modules execute a binding algorithm to exchange identification information and challenge values in order to bind the software modules to one another. During subsequent runtime of the software application, the software modules can use a challenge value to generate a data encryption key. The software modules can then securely transfer data with each other and authenticate one another using the challenge value key and the identification information.

The challenge value exchanged and binding algorithm executed at first time initialization and refreshed during later interactions provide a way for the software modules to authenticate each other during runtime, because an unauthorized application would not have knowledge of the challenge value, identification information, and other protected data. This can mitigate against a rogue application attempting to invoke functions in one of the software, because a rogue application would not have the correct challenge value or other information needed to communicate with the software module being called. Cycling of a challenge value also mitigates against key cracking, because it allows the data encryption key to change over time. The techniques described herein are also scalable and can be easily deployed to millions of devices, because the binding algorithm and key derivation algorithm can be deployed as part of the code written into the software modules.

The following description will focus on an example where the first software module is a mobile application and the second software module is a keystore. However, embodiments also apply to any other suitable types of software modules, and the software modules can be integrated with hardware components (e.g., secure memory hardware).

Prior to discussing specific embodiments of the invention, some terms may be described in detail.

A "communication device" may be a device that includes one or more electronic components (e.g., an integrated chip) that can communicate with another device. For example, a communication device can be a computing device that includes at least one processor coupled to a memory that stores instructions or code for execution by the processor. A "portable communication device" may be a communication device that can be transported and operated by a user, and may include one or more electronic components (e.g., an integrated chip). A portable communication device may provide remote communication capabilities to a network. The portable communication device can be configured to transmit and receive data or communications to and from other devices. A portable communication device may be in the form of a mobile device such as a mobile phone (e.g., smart phone, cellular phone, etc.), tablets, portable media player, personal digital assistant devices (PDAs), wearable device (e.g., watch, health monitoring device such as a fitness tracker, etc.), electronic reader device, etc., or in the form of a card (e.g., smart card) or a fob, etc. Examples of portable communication devices may also include portable computing devices (e.g., laptops, netbooks, ultrabooks, etc.). A portable communication device may also be in the form of a vehicle (e.g., an automobile), or be integrated as part of a vehicle (e.g., an infosystem of a vehicle).

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc. A key can be any suitable size or type. For example, an asymmetric key can be a 2048 bit RSA key, or a P-256 ECC key.

A "limited-use key" or "LUK" may refer to a key that can be used for only a limited time or a limited number of transactions, and may need to be renewed or replenished when the limited usage has been exhausted. The LUK may be associated with a set of one or more limited-use thresholds that limits the usage of the LUK, where once the usage of the LUK has exhausted or exceeded the set of one or more limited-use thresholds, a further transaction conducted using that LUK will be declined even if the underlying account is still in good standing. The set of one or more limited-use thresholds may include at least one of a number of transactions that the LUK can be used for, a time-to-live indicating the duration of time for which the LUK is valid, and/or a cumulative transaction amount indicating the total transaction amount summed across one or more transactions for which the LUK is valid, or any combination thereof.

A "limited-use threshold" may refer to a condition that limits the usage of a piece of information. A limited-use threshold may be exceeded or exhausted when the underlying condition is met. For example, a limited-use threshold may include a time-to-live that indicates an amount of time that a piece of information is valid for, and once that amount of time has elapsed, the limited-use threshold is exceeded or exhausted, and the piece of information may become invalid and may no longer be used. As another example, a limited-use threshold may include a number of times that a piece of information can be used, and once the piece of information has been used for that number of times, the limited-use threshold is exceeded or exhausted, and the piece of information may become invalid and may no longer be used.

An "application" may be computer code or other data stored on a computer readable medium (e.g. memory element or secure element) that may be executable by a processor to complete a task.

A "keystore" may include a container for cryptographic keys. A keystore can be a software module on a computing device. In some embodiments, a keystore can include or utilize secure data storage and/or secure processors, such as a Trusted Execution Environment (TEE) or a Secure Element (SE). A keystore can store cryptographic keys (and other sensitive information) such that they cannot be removed from the secure data storage and/or the secure processor. For example, a cryptographic key can be bound to secure hardware (e.g., TEE or SE) and never exposed outside of the secure hardware. A keystore module can allow a key to be used for an application's processes, but may not allow the key to be exported to the application. For example, the keystore can carry out a cryptographic operation on behalf of the application and/or then deliver the encrypted data to the application. Additionally, a keystore can receive and enforce restrictions regarding how and when a key can be used, as well as what entities are authorized to use the keys. For example, a key may only be used by an application associated with a certain application identifier.

A "challenge element" may include information or data associated with a challenge. A "challenge element" may sometimes be referred to as a "challenge value." For example, a challenge element can include a dynamic alphanumeric data value. In some embodiments, a challenge element can be a random number, a nonce (e.g., a 256 bit, 32 character nonce), a timestamp, or any other suitable value. A challenge element can be used to establish and/or verify authorization for access, binding between software modules, and/or any other suitable inquiry.

A "challenge request" may include a request for a challenge value. A challenge request can be a message from a first software module asking a second software module to provide a challenge value. A challenge request can include information identifying the first software module, such as an application identifier, an application-device identifier (ID), or any other suitable information.

"Whiteboxing" may include providing a secure cryptographic layer within native software. Whiteboxing can be achieved through mangling of cryptographic functions, such as combining both asymmetric and symmetric encryption. Due to cryptographic function mangling, it is difficult or impossible to determine a whiteboxing cryptographic key by memory profiling or debugging mobile application software.

A "token" may include a substitute identifier for some information. For example, a transaction token may include an identifier for a transaction account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "real account identifier" may include an original account identifier associated with an account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

"Account parameters" may refer to information relating to an account that can be used to conduct a transaction on the account. Examples of account parameters may include information that can be used to identify an account of the user (e.g., real account identifier, alternate account identifier, token, etc.), data or information relating to the status of the account, one or more keys that are used to generate cryptographic information, data or information relating to the one or more keys, etc. An account parameter can be semi-static or dynamic. A dynamic account parameter may be an account parameter that has a limited lifespan, and which once expired, can no longer be used to conduct a transaction until the account parameter is replenished, refreshed, or renewed. A dynamic account parameter may be replenished frequently during the lifetime of an account. A semi-static account parameter may be an account parameter that has an extended lifespan that is longer than a dynamic account parameter, and can be replenished less frequently than a dynamic account parameter or not at all during the lifetime of the account.

An "issuer" may typically refer to a business entity (e.g., a bank) that maintains an account for a user that is associated with a portable communication device such as an account enrolled in a mobile application installed on a portable communication device. An issuer may also issue account parameters associated with the account to a portable communication device. An issuer may be associated with a host system that performs some or all of the functions of the issuer on behalf of the issuer. In some embodiments, an issuer may refer to a provider of a software application.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers.

An "access device" may be any suitable device for communicating with a merchant computer or transaction processing network, and for interacting with a transaction device (e.g., a payment device), a user computer apparatus, and/or a user mobile device. An access device may generally be located in any suitable location, such as at the location of a merchant. An access device may be in any suitable form. Some examples of access devices include POS devices, cellular phones. PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device.

A "transaction processing network" may include a network that can process and route transaction request messages. An exemplary transaction processing network may include data processing subsystems, networks, and operations used to support and deliver authorization services, exception file services, transaction scoring services, and clearing and settlement services. An exemplary transaction processing network may include VisaNet™. Transaction processing networks such as VisaNet™ re able to process credit card transactions, debit card transactions, and other types of commercial transactions. VisaNet™, in particular, may include a VIP system (Visa Integrated Payments system) which processes authorization requests and a Base II system which performs clearing and settlement services.

An "authorization request message" may be an electronic message that is sent to request authorization for a transaction. The authorization request message can be sent to a transaction processing network and/or an issuer of a transaction card (e.g., a payment card). An authorization request message according to some embodiments may comply with ISO 8583, which is a standard for systems that exchange electronic transaction information associated with a transaction made by a user using a transaction device or transaction account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a transaction processing network. The authorization response message may include, by way of example only, one or more of the following status indicators. Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing network) to the merchant computer that indicates approval of the transaction. The code may serve as proof of authorization. As noted above, in some embodiments, a transaction processing network may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers.

FIG. 1 illustrates a software operating environment in a computing device 100, according to some embodiments. Computing device 100 can be a computer, a communication device, a portable communication device in the form of a mobile device such as a mobile phone (e.g., smart phone, cellular phone, etc.), a tablet, a portable media player, a personal digital assistant device (PDA), a wearable computing device (e.g., watch), an electronic reader device, a laptop, a netbook, an ultrabook, etc., or in the form of a card (e.g., smart card) or a fob, etc. In some embodiments, computing device 100 can also be part of a vehicle (e.g., an automobile). Computing device 100 may include device hardware 104 such as one or more processors, an operating system 114, and an application 122 executing on computing device 100. In some embodiments, application 122 can be executed within a virtual machine 110.

Application 122 may include multiple software layers. For example, application 122 can include an first software layer written in a high level programming language such as Java, and it can be implemented as a software development kit (SDK). The application 122 can also include a second software layer that is a native layer or native library, and can be written in a low level programming language such as C or C++.

The computing device 100 and application 122 can be associated with several identifiers originating from different entities. For example, the operating system 114 can provide a unique identifier for the computing device 100. This can be an OS identifier. An example of an OS identifier is an Android™ ID.

Additionally, an application providing entity can provide a unique identifier for the application 122 (e.g., the instance of the application on this particular computing device 100). This can be the application-device ID. In some embodiments, a single computing device 100 has two different applications provided by two different application providing services, and each application is associated with a different application-device IDs (e.g., provided by the associated application providing service).

In some embodiments, the some or all of the application 122 software can be provided via a software development kit (SDK). Additionally, an SDK can include a layer that is secured based on guards, obfuscation, and cryptographic whiteboxing. This secure layer can be a whitebox layer. The whitebox layer can be embedded with sensitive information, such as a private key.

The computing device 100 can also include a keystore 133. The keystore 133 can be a software module with data security protections. In some embodiments, the keystore 133 can be a software module on a secure memory hardware component (e.g., a Secure Element). The keystore 133 can securely store one or more encryption or decryption keys such that the encryption or decryption keys cannot be copied or removed, and such that only authorized applications can access and utilize the encryption or decryption keys. In some embodiments, the keystore 133 can include an encryption module for encrypting or decrypting data as well as a key database for storing encryption or decryption keys, each of which may TEE based, SE based, or software based.

The application 122 can communicate with the keystore 133 to exchange data and invoke functions implemented in the keystore 133. For example, the application 122 can invoke functions implemented in the keystore 133 to access the secure keys to decrypt an LUK which in turn can be used to create a cryptogram by the application 122.

According to some embodiments, the keystore 133 can use or process sensitive information. For example, as mentioned above, the keystore 133 can provide and store secure keys used to protect the sensitive key information (LUK). The keystore 133 in this secure manner can decrypt a key used to generate the LUK and enable the application 122 to use it securely for cryptogram generation. The keystore 133 may be susceptible to fraudulent and inappropriate requests. For example, a rogue application 152 (e.g., unauthorized code, malware, etc.) or other unauthorized entities may attempt to access a secure key protected by the keystore for use in a cryptographic algorithm. If the keystore 133 fails to properly identify and authenticate the requesting entity or application, it may be possible for rogue application 152 to obtain sensitive information by getting access to secure keys in the keystore, or to directly invoke functions implement in the keystore 133 to obtain sensitive data.

To mitigate against these vulnerabilities, the keystore 133 may only allow authorized applications to utilize keys and/or functions at the keystore 133. For example, the keystore 133 may link a certain key with one or more specific applications and/or application identifiers that are authorized to use the key. These applications and application identifiers can be specified when the key is first provided to the keystore 133 (e.g., when an application including a key is first installed on the computing device 100).

Further, embodiments of the invention further improve security through a process of binding software modules (e.g., application 122 and keystore 133). As a result, the keystore 133 can reliably determine the identity of the application 122, as well as determine whether the application 122 is authorized to access a key or function at the keystore 133.

It should be understood that, while the application 122 and keystore 133 will be described as a detailed example, the techniques described herein can be applied to any combination of a software application modules and secure data/functions modules. For example, each instance of "application 122" can be more generically replaced by "first software module," and each instance of "keystore 133" can be more generically replaced by "second software module."

Figure 2:
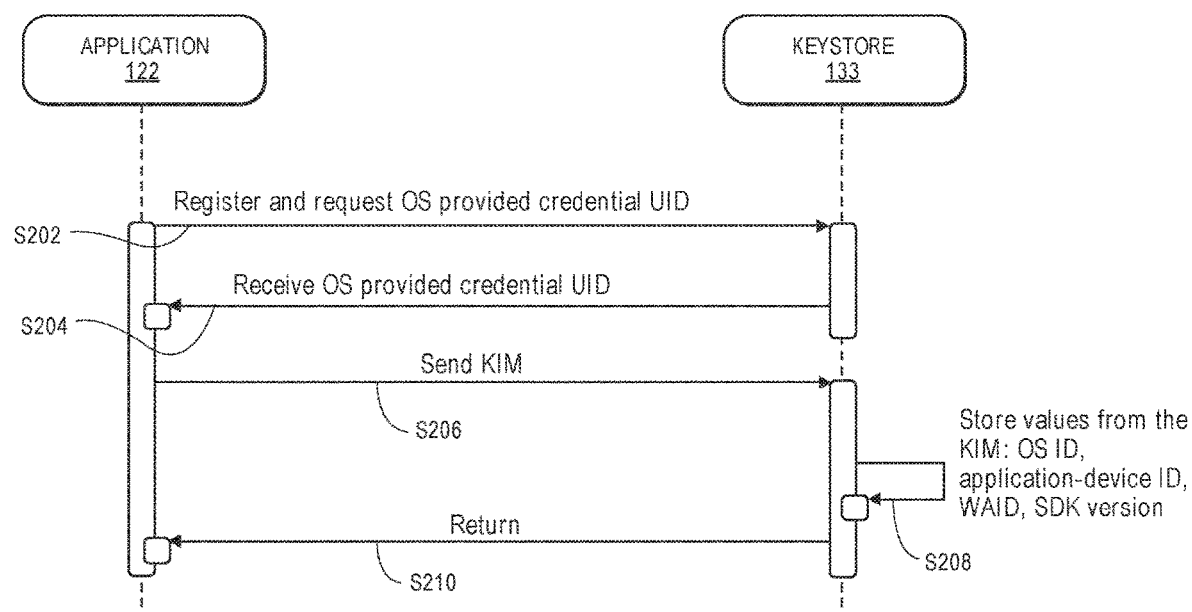
FIG. 2 shows a diagram illustrating initial communications between an application and a keystore, according to an embodiment of the invention.

Before binding the application 122 and keystore 133, an initial information exchange can take place. A method 200 for exchanging initial information between an application and a keystore, according to embodiments of the invention, can be described with respect to FIG. 2.

A user can download and install an application 122 onto a computing device 100. The download and installation can take place when the computing device 100 is in a trusted state (e.g., a higher than average trusted state). For example, the computing device 100 can first be authenticated (e.g., an OS ID can be verified as authentic) to achieve the trusted state by an application server computer. A user of the computing device 100 can also be authenticated (e.g., via password or biometrics) at the computing device 100 or at an application server computer.

At step S202, the application 122 can begin registration with the keystore 133. This can include sending a request that the keystore 133 (or computing device 100 operating system) provide a UID (unique identifier) for the application 122 (e.g., unique among keystore-issued identifiers). This step can take place when the application 112 is first installed, first opened and executed by the user, or any other suitable time.

At step S204, the keystore 133 can provide a UID to the application 122. The keystore 133 provides the UID so that the application 122 can use the UID as an identifier when communicating with the keystore 133. It can be the same or different than the UID described in step S202. In some embodiments, the UID can also serve as an access credential for accessing keys or other sensitive data at the keystore 133. For example, the keystore 133 may store a record about the application 122 (e.g., including access privileges, other application identifiers, a challenge value, an application public key, etc.), and the record can be identified based on the UID. Any of the subsequent messages sent from the application 122 to the keystore 133 (e.g., in this method or the following methods) can include the UID in order to identify the application 122. Other software modules cannot use or impersonate this UID.

At step S206, the application 122 can send keystore initialization material (KIM) to the keystore 133. KIM can include a public key from an asymmetric whiteboxing key (ABK) pair (public-private key pair) associated with the application 122. KIM can also include a an application-device ID (e.g., an identifier for the instance of the application 122 on this device provided by an application server), an OS identifier (e.g., an identifier for this device provided by the operating system), a wallet identifier (e.g., a user identifier for a wallet account), and SDK version information (e.g., an SDK version identifier). In some embodiments, the KIM information, in combination, can uniquely identify the application 122. Accordingly, some or all of the KIM can be used as a software module identifier for the application 122 (e.g., in addition to or instead of the UID).

At step S208, the keystore 133 stores the KIM information received from the application 122. The stored KIM can be associated with the UID. Accordingly, the keystore 133 can possess information that uniquely identifies the application 122, and can use this stored information to verify the application 122 during future communications. At step S210, the keystore 133 can send a response to the application 122 indicating that the KIM was successfully received and stored.

In some embodiments, the application 122 can, during installation, request or provision one or more secure cryptographic keys for itself from the keystore 133. These secure cryptographic keys can be then used to protect sensitive assets or decrypt keys belonging to the application 122. The secure cryptographic keys are not revealed to the application 122. These keystore 133 can create an association between these keys and the application 122 (e.g., the UID), and can securely store and restrict the keys such that only the application 122 (and/or other indicated applications) can use them. For example, the keys may only be used by an application associated with correct UID.

Figure 3A:
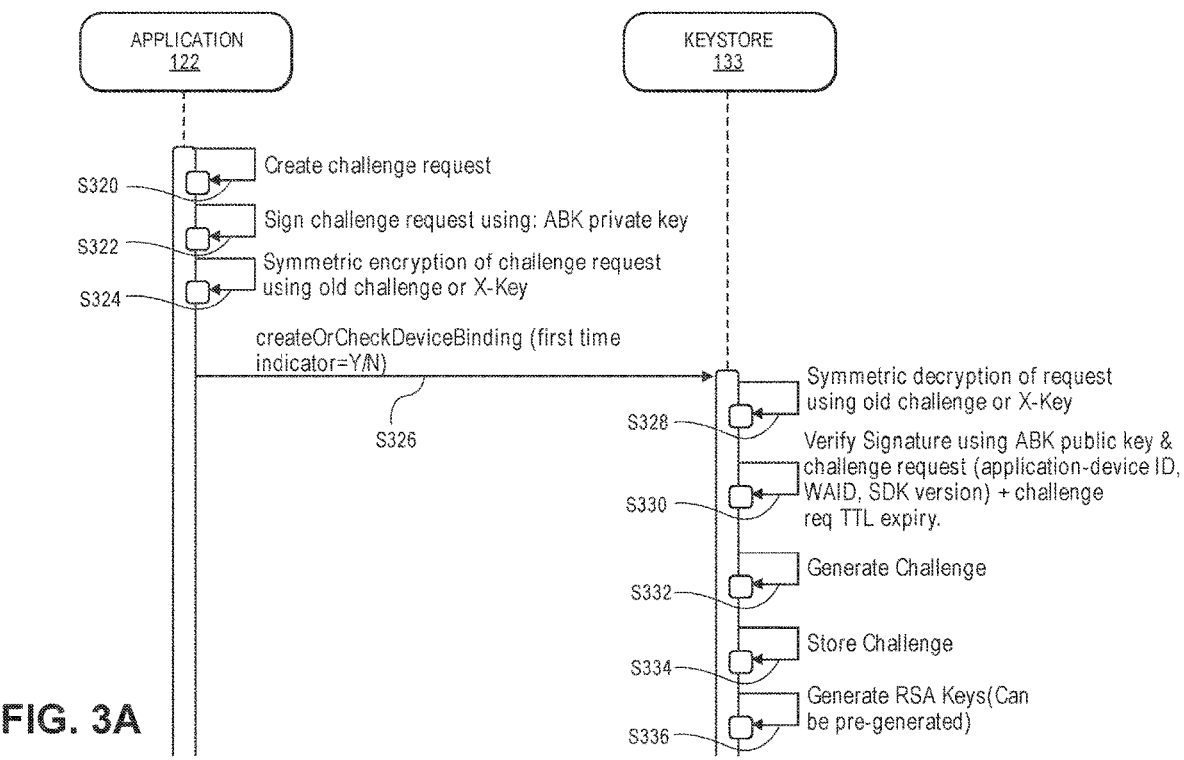
FIGS. 3A-3C shows a diagram illustrating a first set of device binding communications between an application and a keystore, according to an embodiment of the invention.
Figure 3B:
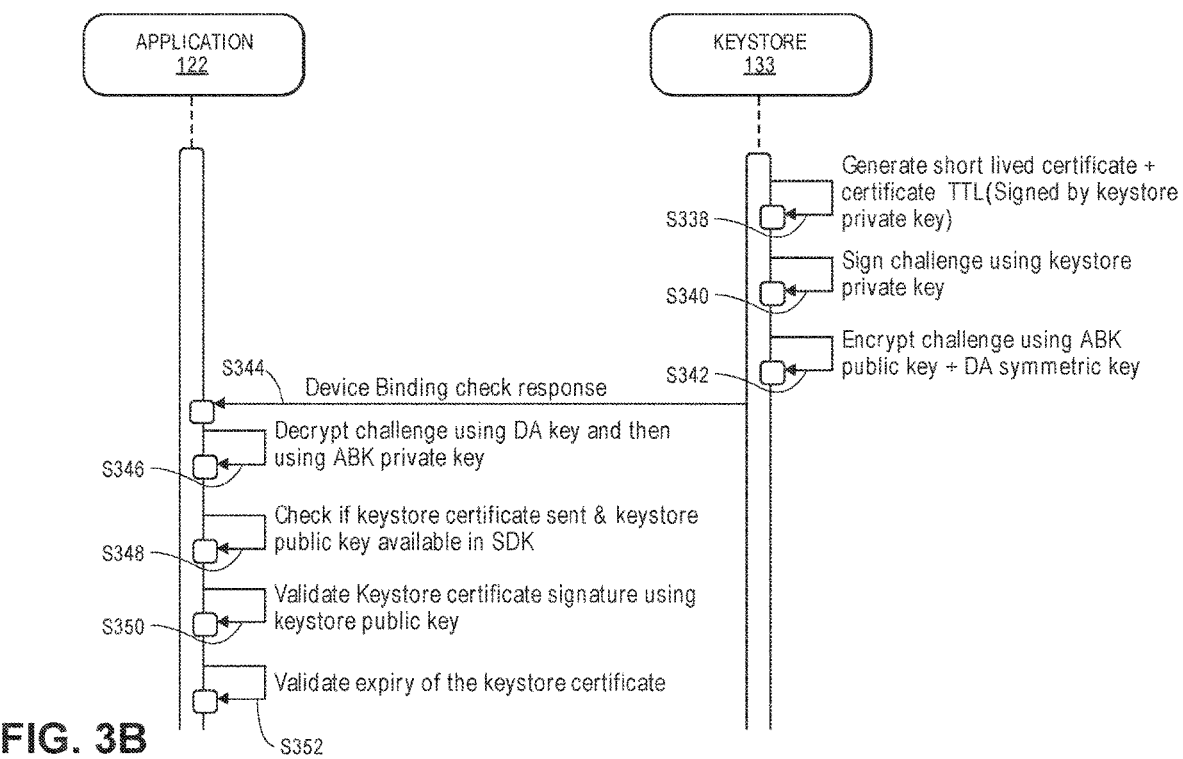
Figure 3C:
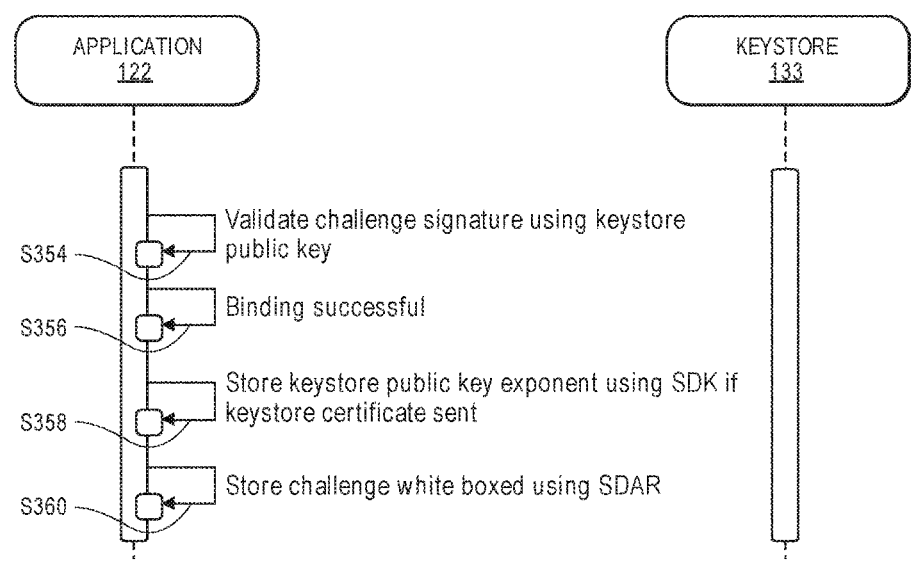

Having made initial contact and obtained a UID, the application 122 can proceed to establish binding with the keystore 133. A method 300 for binding an application with a keystore, according to embodiments of the invention, can be described with respect to FIGS. 3A-3C.

At step S320, the application 122 creates a request for a challenge value. The challenge request can include data elements including an application-device ID, a wallet identifier, SDK version information, a value indicating a time period such as a time to live (TTL) value, and any other suitable information. Obtaining a challenge value can assist with binding, because a challenge value can enable the application 122 to communicate securely and self-authenticate with the keystore 133 in the future.

At step S322, the application 122 can digitally sign the challenge request. For example, the application 122 can create a digital signature for the challenge request using the ABK private key (e.g., the private key corresponding to the ABK public key).

At step S324, the application 122 encrypts the challenge request. For example, if binding is not yet established, the challenge request can be encrypted using an X-Key.

An X-Key can be an encryption key derived by combining (e.g., concatenating and/or hashing) identifiers associated with the computing device 100 and/or application 122. For example, the X-Key can be generated by concatenating the OS ID, the application-device ID, and the wallet account ID, and then hashing the data string using any suitable hashing algorithm (e.g., SHA 256). In some embodiments, the X-Key is a symmetric key, and the challenge request message can be encrypted using any suitable symmetric encryption algorithm (e.g., AES)

At step S326, the application 122 sends a request to the keystore 133 to create (or check for) device binding. The request includes the encrypted challenge request. The application 122 can also indicate whether a binding has or has not already been established.

At step S328, the keystore 133 decrypts the challenge request message. For example, the keystore 133 can also derive and use the same X-Key (e.g., using the same input information) to decrypt the challenge request.

At step S330, the keystore 133 verifies the digital signature. For example, the keystore 133 can identify the ABK public key associated with the application 122 (e.g., based on a UID other identifiers provided in the challenge request), and the keystore 133 can verify the authenticity of the digital signature using the ABK public key along with information in the challenge request message (e.g., the application-device ID, the wallet account ID, the SDK version information, and TTL expiry information).

Having verified the digital signature, and thereby having verified that the challenge request legitimately came from the application 122 (e.g., the application 122 associated with the indicated UID), the keystore 133 can proceed with the binding process. To perform the binding process, the keystore 133 provides a challenge value and a keystore public key (for future communications) to the application 122. To accomplish this, the keystore 133 performs the following steps S332-S344.

At step S332, the keystore 133 generates a new challenge value. A challenge value can include a random value (e.g., a nonce), or any other suitable one-time-use information. The challenge value can also be associated with a time period of validity (e.g., a TTL value).

At step S334, the keystore 133 stores the generated challenge value. For example, the challenge value can be associated with the application's UID and stored in a keystore database.

At step S336, the keystore 133 generates and/or obtains a set of encryption and/or decryption keys. The keys can include an RSA key pair (e.g., a private key and a public key associated with the keystore 133). In some embodiments, the keys can be used exclusively for communication with the application 122.

At step S338, the keystore 133 generates a certificate and a corresponding time to live (TTL) value for the certificate. The certification can be a short lived certificate, as indicated by the TTL value. The certificate can be digitally signed using the keystore private key from step S336. In some embodiments, the certificate can include the keystore public key, an expiration time (e.g., TTL value), SDK version information, the application-device ID, the wallet account identifier, and any other suitable information. Thus, the certificate can be used as a tool for providing the keystore's public key to the application 122.

At step S340, the keystore 133 creates a digital signature for the challenge value (e.g., using the keystore private key). A signed challenge blob can include the digital signature and the certificate.

At step S342, the keystore 133 encrypts the challenge value using the ABK public key (e.g., identified from storage using the UID) such that only the application 122 can decrypt and obtain the challenge value. In some embodiments, the encrypted challenge value can be subjected to another round of encryption using a device authentication (DA) key, such that the challenge value is double-encrypted using two different keys.

A DA key can be created by combining and formatting computing device 100 parameters in a secret (e.g., proprietary) manner. The parameters can include the application-device ID, the wallet account ID, and the SDK version ID. The parameters can be combined and hashed (e.g., using SHA 256). The DA key can be a symmetric key used with a symmetric encryption algorithm (e.g., AES-GCM 128).

It can be advantageous to introduce and use the DA key at step S342 instead of the X-key because it adds another layer of security into the process. A malicious application attempting to fraudulently bind would have to be able to create and use both the X-key and the DA key. Additionally, the DA key can occasionally rotate, changing whenever the SDK version ID changes.

At step S344, the keystore 133 sends a device binding response message to the application 122. This response message can include the encrypted challenge value, the certificate, the digital signature, and any other suitable information.

At step S346, the application 122 decrypts the encrypted challenge value. For example, the application 122 can first decrypt using the symmetric DA key (e.g., created in the same manner as the DA key at the keystore 133). The application 122 can then perform an additional decryption using the ABK private key.

At step S348, the application 122 can determine whether the certificate and public key received from the keystore match a certificate and public key stored by the SDK. If there is a match, the certificate and public key can be considered valid. Accordingly, the application 122 can receive, via the certificate, the keystore's public key, such that the application 122 can securely encrypt and send information to the keystore 133 in the future.

At step S350, the application 122 can use the public key to validate the authenticity of the certificate. At step S352, the application 122 checks the expiration time of the certificate and verifies that the expiration time has not yet passed.

At step S354, the application 122 can use the public key to validate the digital signature associated with the challenge value, and thereby verify that the challenge value was legitimately generated and sent by the keystore 133.

At step S356, the application 122 can be finished with verifying the information received from the keystore 133. The binding process can be considered successful because the keystore 133 possesses an application public key, the application 122 possesses a keystore public key, and the application 112 and keystore 133 both possess the same challenge value (e.g., such that they can both create the same symmetric key during a future message exchange). Thus, communications going either way can be encrypted with both an asymmetric key and a dynamic symmetric key, enabling secure communication and reliable authentication.

At step S358, the application 122 can store the keystore public key (e.g., the public key exponent). In some embodiments, before storing, the keystore public key can first be encrypted (e.g., using an SDAR key). An SDAR (secure data at rest) key can be a key used to protect the most sensitive assets (e.g., a limited use key) on the computing device 100.

At step S360, the application 122 also stores the received challenge value. Before storing, the challenge value can be whiteboxed using the SDAR key. As a result, the challenge value can be stored securely.

Embodiments of the invention allow the above method to be repeated at a later time for several other purposes besides initial binding. For example, the method can be used for mobile application platform (MAP) device cryptography initialization, enrolling a PAN, provisioning a token, replenishing (e.g., an expired value), rotation of device keys, and migration of SDK versions (e.g., which involves migration of SDK data). The method can also be executed on demand, and can be called by an application provider if needed (e.g., during suspicion of fraud or device tampering).

When the method is performed again at a later time, the challenge value can be used as a new symmetric encryption key (or used for generating a new key). The challenge value-based key can be used instead of the X-key (e.g., at steps S324 and S328) and/or instead of the DA key (e.g., at steps S342 and S346). The challenge value can be considered an old challenge value, as another challenge value will be created during the repeated process. This challenge value can be replaced during each iteration of the process. As a result, a different symmetric key is used for each subsequent iteration of the process.

Additionally, when the method is performed for a second (or more) time, the request sent at step S326 can be a request to check for binding (e.g., instead of creating a binding). The request can include an indication that this is not the first time such a request is being sent. Also, in some embodiments, when the method is performed for a second (or more) time, the keystore 133 may provide a new keystore public key for a new keystore key pair via the certificate. In this case, the application 122 can replace the old keystore public key with the new keystore public key (e.g., replace the stored key in the whiteboxed layer of the SDK).

Having established binding between the application 122 and the keystore 133, the application 122 may now be able to access the keystore 133 to use one or more keys. For example, in some embodiments, the application 122 can be a payment application. When the user causes the payment application to make a payment (e.g., attempt to tap and pay using NFC), the payment application can access the keystore 133 in order to use a key at the keystore 133 to decrypt a key used to generate a cryptogram for the payment.

However, the keystore 133 may not allow just any application to request access to its keys. Accordingly, the application 122 may be first interact with the keystore 133 to check for binding and demonstrate that the application 122 is an approved requestor.

Figure 4A:
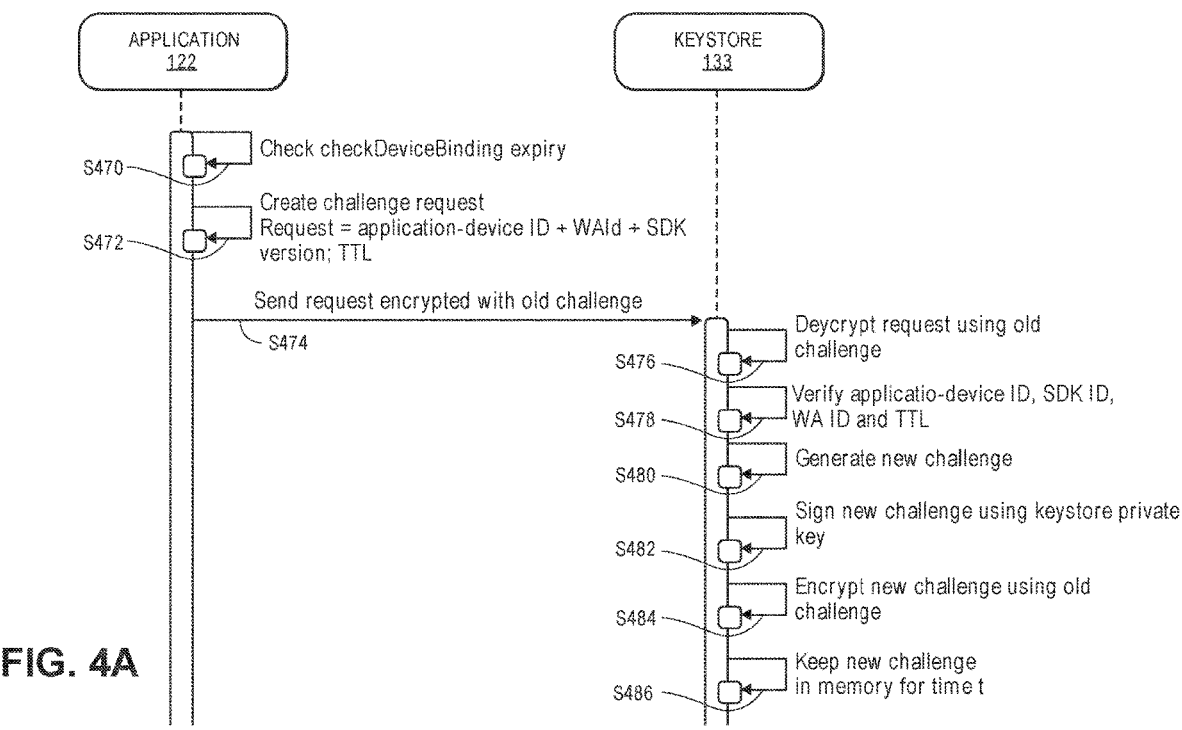
FIGS. 4A-4B shows a diagram illustrating a second set of device binding communications between an application and a keystore, according to an embodiment of the invention.
Figure 4B:
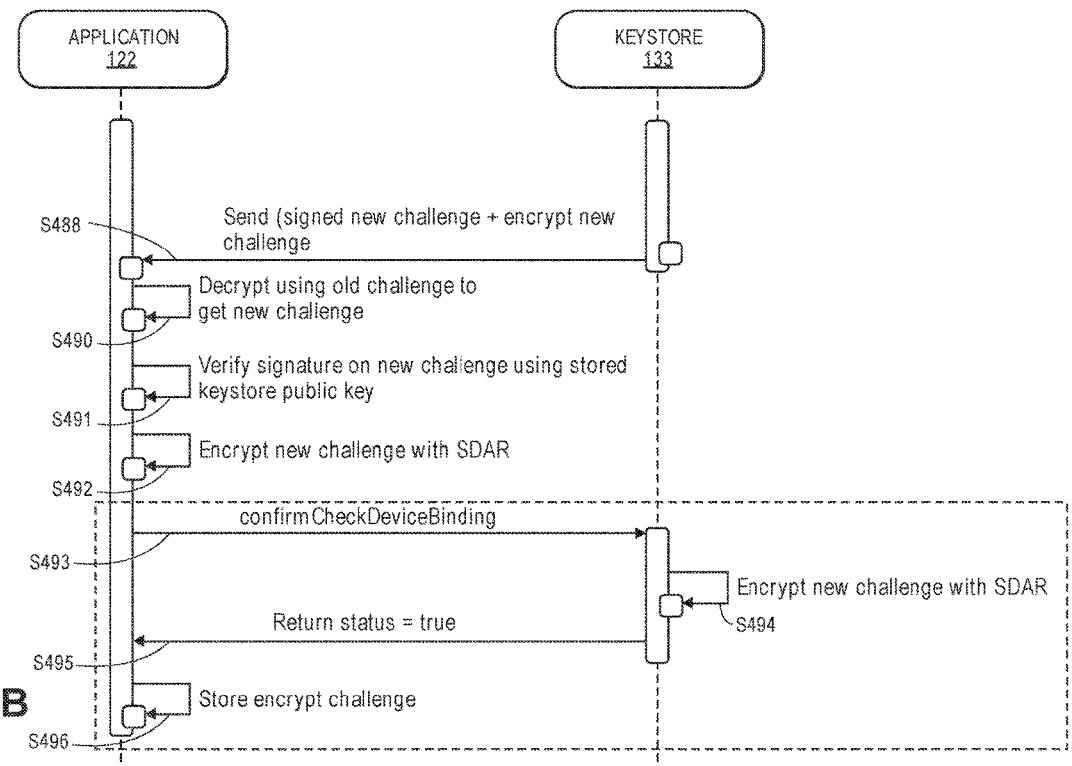

A method 400 for checking for binding between an application and a keystore, according to embodiments of the invention, can be described with respect to FIGS. 4A-4B.

At step S470, the application 122 may determine whether binding needs to be checked between the application 122 and the keystore 133. For example, if the application 122 recently confirmed binding with the keystore 133 (e.g., within the last minute, 5 minutes, 10 minutes, 1 hour, etc.), the application 122 may not need to check the binding again and the cryptogram generation and payment can proceed without completing the method 400. This can improve efficiency in situations when a user conducts multiple payments in a short time period (e.g., before a time limit expires).

At step S472, the application 122 creates a request message for a new challenge value. The challenge request can include data elements including the application-device ID, the wallet application identifier, SDK version information, TTL information, and/or any other suitable information.

At step S474, the application 122 encrypts the challenge request and sends the encrypted challenge request to the keystore 133. The previous challenge value (e.g., a challenge value obtained during a previous message exchange) can be used to encrypt the challenge request. For example, a symmetric key can generated based on the previous challenge value. As a result, the challenge request can be encrypted with a dynamic and unique symmetric key that can only be generated by the application 122 and the keystore 133, because only the application 122 and keystore 133 possess the previous challenge value, and both the application 122 and keystore store the challenge value securely (e.g., in a whiteboxed layer, in secure hardware, etc.).

At step S476, the keystore 133 can decrypt the encrypted challenge request. For example, the keystore 133 can use a matching symmetric key generated based on the previous challenge value. In some embodiments, the keystore 133 can identify the previous challenge value (e.g., to use for decrypting) based on a UID and/or other application 122 identifiers.

In some embodiments, the application 122 can additionally (or alternatively) encrypt some or all of the challenge request information using the keystore's public key. Then, the keystore 133 can decrypt the challenge request using the keystore's private key. Thus, the challenge request can be protected by encryption using both a symmetric key and an asymmetric key.

At step S478, the keystore 133 can verify information in the challenge value request message. For example, the keystore 133 can verify the application-device ID, the SDK ID, the wallet account ID, and the TTL information. The keystore 133 can determine that these identifiers are all associated with each other and/or a UID (e.g., based on information stored during step S208 of the method 200).

Having identified a previous challenge value associated with the application 122, successfully decrypted a message using the previous challenge value (e.g., indicating that the application 112 also possesses the same challenge value), and successfully verified the application 112 identification information in the challenge request, the keystore 133 can consider the application 122 to be trustworthy and bound to the keystore 133. Accordingly, the keystore 133 can allow the application 122 to access keystore processes. The keystore 133 can also provide a new challenge value in order to maintain the binding.

At step S480, the keystore 133 generates a new challenge value, such as a random number. This new challenge value can be distributed and stored in preparation for a subsequent communication interaction between the application 122 and keystore 133. For example, the new challenge value can be used as an encryption key for a future communication.

At step S482, the keystore 133 signs the new challenge value. For example, the keystore 133 can create a digital signature using the keystore private key.

At step S484, the keystore 133 encrypts the new challenge value. The new challenge value can be encrypted using the previous challenge value (e.g., the symmetric key generated using or obtained from the previous challenge value).

At step S486, the keystore 133 can maintain the new challenge value in a system memory for a certain time without creating a stored record of the new challenge value in a database. Storing can happen later at step S494, provided a confirmation is received at S493.

At step S488, the keystore 133 sends the encrypted challenge value and the digital signature to the application 122.

At step S490, the application 122 decrypts the encrypted challenge value using the previous challenge value (e.g., the symmetric key generated using or obtained from the previous challenge value).

At step S491, the application 122 verifies the digital signature associated with the new challenge value. For example, the application 122 uses a stored keystore public key to verify the authenticity of the digital signature. The application 122 can thereby verify that the new challenge value is an authentic challenge value legitimately provided by the keystore 133.

At step S492, the application 122 encrypts the new challenge value using the SDAR key. At step S493, the application 122 sends a message to the keystore 133 indicating that the binding is confirmed, and the new challenge value was received.

At step S494, the keystore 133 stores the new challenge value in a database. The database record can indicate that the new challenge value is associated with a specific application (e.g., by storing one or more application identifiers).

At step S496, the keystore 133 can return a message to the application 122 indicating that the binding is confirmed and the challenge value updated at the keystore as well.

At step S496, the application 122 stores the new challenge value that is encrypted using the SDAR key. The application 122 can use this stored challenge value for encrypting a subsequent challenge request at a later time.

As mentioned above, because the binding between the application 122 and the keystore 133 is confirmed, the keystore 133 can proceed to perform one or more tasks for the application 122, or otherwise allow the application 122 to use one or more keys. For example, the keystore 133 can decrypt a key that can be used to generate a cryptogram (e.g., using an LUK) for a payment at the request of the application 122. In some embodiments, the keystore 133 can grant access to keys that are already associated with the same UID (or other application 122 identifier). In other embodiments, the keystore 133 can execute a function or use a key requested by the application 122 (e.g., a key indicated by a key reference value).

The keystore 133 can allow the application 122 to access restricted functions and data after step S478, after step S494, when the process is complete, or at any other suitable time. In some embodiments, the keystore 133 can have keys used to decrypt a key, which can be used to generate a cryptogram in parallel with the method 400, but the decrypted key may not be provided to the application 122 or otherwise released until the binding is confirmed. In other embodiments, the application 122 may wait to request cryptogram generation or initiate a payment until after the binding is confirmed (e.g., wait until after step S491 or S497).

The method 400 can include some steps similar to the method 300, but can also omit some steps that are included in the method 300. For example, the method 400 can omit steps for generating and verifying a keystore digital certificate. The allows faster verification during the method 400, such that the payment (or other activity) that invoked the method 400 can be completed more quickly.

Figure 5:
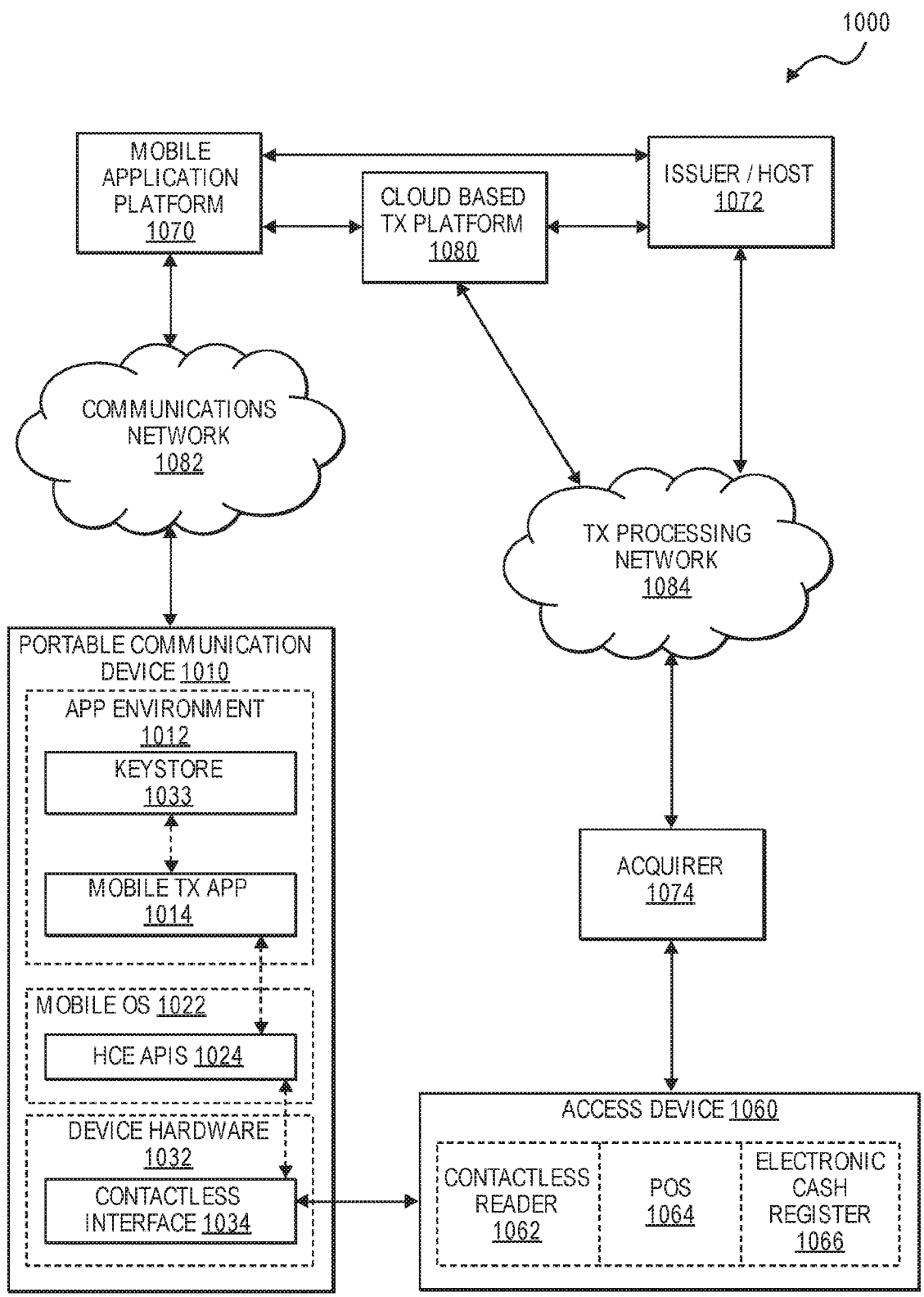
FIG. 5 illustrates a block diagram of system, according to some embodiments.

FIG. 5 illustrates a block diagram of an exemplary system 1000 in which the software module binding techniques described herein can be used, according to some embodiments. System 1000 can be, for example, a cloud-based transaction system for conducting cloud-based transactions. It should be understood that the software module binding and authentication techniques described herein can be applied to other types of systems which may or may not relate to transaction processing.

System 1000 includes a portable communication device 1010 (e.g., a mobile device), a cloud-based transaction platform (CBP) 1080, and a mobile application platform (MAP) 1070. CBP 1080 may be implemented using one or more computing devices, and can be associated with or operated by an issuer, transaction processor, and/or other suitable entities. CBP 1080 implements a set of functionalities including account management, and account parameters generation and replenishment to enable could-based transactions to be conducted via portable communication device 1010.

MAP 1070 is used to facilitate communications between CBP 1080 and mobile application 1014 (e.g., a transaction application) in portable communication device 1010. MAP 1070 may be implemented using one or more computing devices, and can be associated with or operated by the service provider of mobile application 1014 (e.g., mobile software application), such as an issuer, a mobile wallet provider, a merchant, and/or other suitable entities. In some embodiments, MAP 1070 can be associated with or operated by the same entity as CBP 1080, or they can be separate. MAP 1070 is used to intermediate requests between the mobile application 1014 and CBP 1080, and to ensure that requests and responses initiated by either party are fulfilled once connectivity to portable communication device 1010 is established, for example, via a communications network 1082 (e.g., internet, mobile or cellular network, etc.). It should be understood that in some embodiments, one or more functionalities of CBP 1080, MAP 1070, and/or issuer or host processing system 1072, may be integrated into the same computing system or different computing systems.

Portable communication device 1010 can be used to conduct cloud-based transactions (e.g., payment transactions) facilitated by CBP 1080 and/or MAP 1070. Portable communication device 1010 includes device hardware 1032, mobile operating system (OS) 1022, and applications environment 1012. Device hardware 1032 includes a contactless interface 1034 that can contactessly communicate or otherwise present information to another device such as a contactless reader 1062 of an access device 1060. Examples of contactless interface 1034 can include a near-field communications (NFC) interface that can send and receive communications using radio frequency, or other wireless communication protocols such as Bluetooth, Bluetooth Low Energy (BLE), W-Fi, etc. Examples of contactless interface 1034 may also include an optical interface such as a display to present information such as quick response (QR) codes, bar codes, etc.

Applications environment 1012 of portable communication device 1010 may include a mobile application 1014 such as a transaction application provided by a service provider (e.g., an issuer). For example, if the service provider of mobile application 1014 is an issuer, mobile application 1014 may be a mobile banking application or a mobile payment application. If the service provider is a mobile wallet provider such as a mobile network operator or third-party wallet provider that supports multiple issuers, mobile application 1014 may be a mobile wallet application. For merchants, mobile application 1014 may be a merchants own transaction application from which consumers can conduct e-commerce or point of sale transactions, or a mobile wallet application supporting multiple merchants.

In some embodiments, mobile application 1014 may include on-device cloud-based transaction logic integrated into mobile application 1014 to support cloud-based transactions. The on-device cloud-based transaction logic performs functions to facilitate cloud-based transactions such as to take account parameters provided for use in payment transactions and deliver them to mobile operating system 1022 for transmission over contactless interface 1034. For example, the on-device cloud-based transaction logic may use a cryptogram key (e.g., a limited-use key) provisioned from CBP 1080 to generate a transaction cryptogram that is transmitted over contactless interface to access device 1060 to conduct a payment transaction. The transaction cryptogram can be sent over to the transaction processing network 1084 to obtain authorization for the payment transaction. The on-device cloud-based transaction logic also manages the initial service profile parameters that are provided after an account has been provisioned to ensure that requests for account parameter replenishment and other account parameter management activities are initiated.

To provision portable communication device 1010 for cloud-based payment transactions, CBP 1080 can be used to configure account portfolios associated with issuers and to provide portable communication device 1010 with account parameters for use when conducting cloud-based transactions. The account portfolios established by CBP 1080 can include characteristics such as risk parameters (e.g., velocity controls) that manages the triggers of when account parameters on a provisioned device will need to be refreshed for accounts in each portfolio. To ensure consistent performance and usability, a set of minimum parameters configurable in a service profile can be implemented by CBP 1080. To ensure that cloud-based payment transactions are processed according to the rules specified in the service profile for an account portfolio, CBP 1080 performs various core functions during the lifetime of an account that has been enabled. These functions can include provisioning, active account management, verification for payment, transaction processing, lifecycle management and post-payment.

CBP 1080 may create a service profile for a portfolio before an account is provisioned as a cloud-based transaction account. Provisioning may include taking an enrolled account, create account information such as an alternate account identifier (e.g., alternate Primary Account Number (PAN)) or a token acting as an account identifier substitute that can be used instead of a real account identifier (e.g., a real PAN) to conduct transactions, and inheriting service profile has been established for the portfolio. Once an account is provisioned, the relevant service profile details are shared with both the transaction processing and the on-device cloud-based transaction logic to ensure that decision making can be done at transaction processing and during mobile application usage by the user.

Once an account is provisioned, active account management can be performed by CBP 1080. Active account management can be initiated either from transaction processing activity or from mobile application activity. After the account has been provisioned, the active account management capability generates the initial set of account parameters to be deployed to portable communication device 1010. The account parameters may include account information generated during provisioning (e.g., alternate account identifier or token), as well as dynamic information to ensure the set of account parameters have only a limited use or limited lifespan once delivered to the device. Dynamic information may include limited-use cryptogram keys or dynamic data depending on what type of transaction is being supported. For example, the dynamic information may include limited-use keys (LUK) to calculate cryptograms, as well as limited use dynamic data to support legacy dynamic card verification value or code based implementations.

During transaction processing, if the service profile parameters maintained by CBP 1080 for a particular account indicate that account parameters on portable communication device 1010 need to be replaced, the active account management capability of CBP 1080 may connect to portable communication device 1010 via MAP 1070 to replenish account parameters. Likewise, if the on-device service profile parameters stored on portable communication device 1010 indicate that account parameter replenishment is needed or is close to be being needed (i.e., by monitoring account parameter thresholds), then mobile application 1014 can make a request to CBP 1080 for account parameter replenishment.

Applications environment 1012 of portable communication device 1010 may further include a secure data and/or functions module such as a keystore 1033. A keystore 1033 can securely store and use encryption and/or decryption keys and/or any other suitable data. For example, the dynamic information described above (e.g., LUKs) can be stored at the keystore 1033. When the mobile application 1014 needs a cryptogram or other dynamic data, the mobile application 1014 can invoke the keystore 1033 to decrypt a key that is used to form an LUK In some embodiments, this exemplary keystore 1033 can be stored or executed at another area of the portable communication device 1010 instead of the applications environment 1012. For example, the keystore 1033 can be a part of the mobile OS 1022, or executed by a secure memory hardware (e.g., a secure element).

Once portable communication device 1010 has been provisioned to conduct cloud-based transactions, transactions can be conducted via portable communication device 1010 by interacting with a contactless reader 1062 of an access device 1060 (e.g., at a merchant location). Components of access device 1060 may include point-of-sale (POS) terminal 1064 and/or electronic cash register 1066. Access device 1060 can be coupled to acquirer 1074 (e.g., via a merchant computer not shown). Acquirer 1074 may be connected to an issuer or host processing system 1072 via transaction processing network 1084. Transaction processing network 1084 may include one or more server computers. A server computer is typically a powerful computer or cluster of computers. For example, the server computer can be a large mainframe, a minicomputer duster, or a group of servers functioning as a unit. In one example, the server computer may be a database server coupled to a Web server. Transaction processing network 1084 may use any suitable wired or wireless network, including the Internet.

Transaction processing network 1084 may include data processing subsystems, networks, and operations used to support and deliver authorization services, exception file services, transaction scoring services, and clearing and settlement services. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

Each of the entities (e.g., acquirer 1074, transaction processing network 1084, issuer or host processing system 1072) may include one or more computers to enable communications, or to perform one or more of the functions described herein.

To conduct a cloud-based transaction, a user of portable communication device 1010 may tap portable communication device 1010 against contactless reader 1062 (e.g., via NFC) of access device 1060, or display an image such as a bar code or QR code on a screen of portable communication device 1010 that can be scanned by contactless reader 1062 (e.g., an optical scanner or reader) of access device 1060. In some embodiments, portable communication device 1010 may provide access device 1060 with an account identifier (e.g., an alternate account identifier, a token, etc.) and additional information such as limited-use account parameters or information derived from the limited-use account parameters. For example, an account identifier or token, and/or additional information (e.g., transaction cryptogram) can be encoded in a bar code or QR code that is scanned by access device 1060; or the account identifier or token, and/or additional information can be transmitted to access device 1060 via NFC. In some embodiments, the limited-use account parameters may include a transaction cryptogram.

Access device 1060 or a merchant computer coupled to access device 1060 may generate an authorization request message including the account identifier and additional information (e.g., limited-use account parameters, or information derived from the limited-use account parameters), and forward the authorization request message to acquirer 1074. The authorization request message is then sent to transaction processing network 1084. Transaction processing network 1084 then forwards the authorization request message to the corresponding issuer or host processing system 1072 associated with an issuer of the account associated with portable communication device 1010.

After issuer or host processing system 1072 receives the authorization request message, the authorization request message may be parsed, and information in the authorization request message may be sent to CBP 1080 for verification. An authorization response message is then sent back to transaction processing network 1084 to indicate whether the current transaction is authorized (or not authorized). Transaction processing network 1084 then forwards the authorization response message back to acquirer 1074. In some embodiments, transaction processing network 1084 may decline the transaction even if issuer or host processing system 1072 has authorized the transaction, for example depending on a value of a fraud risk score or depending if limited-use account parameters are verified by CBP 1080. Acquirer 1074 then sends the authorization response message to the merchant computer and/or access device 1060. The authorization response results may be displayed by access device 1060, or may be printed out on a physical receipt. Alternately, if the transaction is an online transaction, the merchant may provide a web page or other indication of the authorization response message as a virtual receipt. The receipts may include transaction data for the transaction.

At the end of the day, a normal clearing and settlement process can be conducted by transaction processing network 1084. A clearing process is a process of exchanging financial details between an acquirer and an issuer to facilitate posting to a customer's payment account and reconciliation of the user's settlement position.

Figure 6:
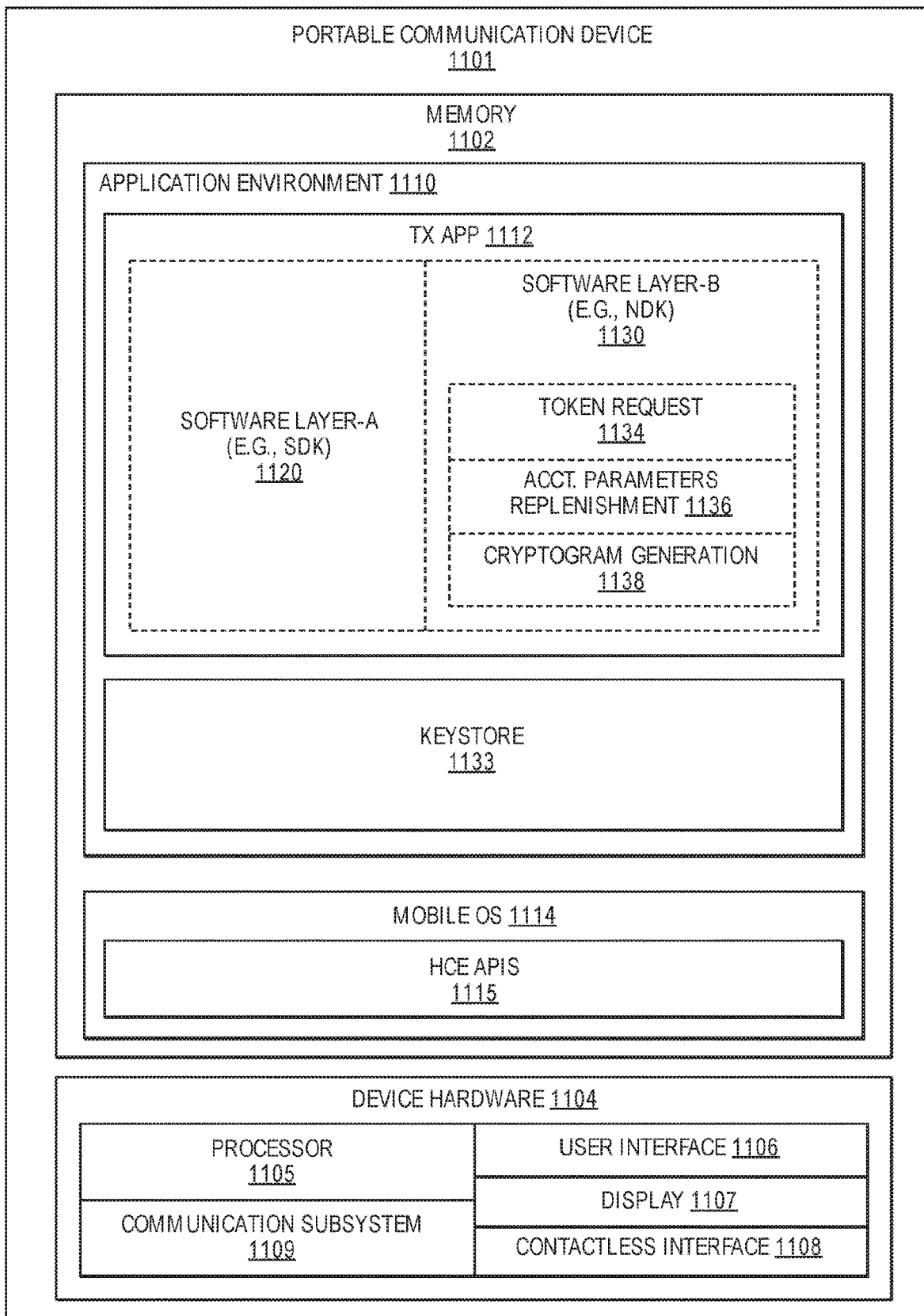
FIG. 6 illustrates a block diagram of portable computing device, according to some embodiments.

FIG. 6 illustrates a block diagram of a portable communication device 1101 (e.g., implementing portable communication device 1010) in which some embodiments of the processes described herein can be implemented. Portable communication device 1101 may include device hardware 1104 coupled to a memory 1102. Device hardware 1104 may include a processor 1105, a communications subsystem 1109, use interface 1106, a display 1107 (which may be part of user interface 1106), and a contactless interface 1108. Processor 1105 can be implemented as one or more integrated circuits (e.g., one or more single core or multicore microprocessors and/or microcontrollers), and is used to control the operation of portable communication device 1101. Processor 1105 can execute a variety of programs in response to program code or computer-readable code stored in memory 1102, and can maintain multiple concurrently executing programs or processes. Communications subsystem 1109 may include one or more RF transceivers and/or connectors that can be used by portable communication device 1101 to communicate with other devices and/or to connect with external networks. User interface 1106 can include any combination of input and output elements to allow a user to interact with and invoke the functionalities of portable communication device 1101. In some embodiments, display 1107 may be part of user interface 1106.

Contactless interface 1108 may include one or more RF transceivers to interact with a contactless reader of an access device to conduct a transaction (e.g., payment transaction, access transaction, information exchange, etc.). In some embodiments, contactless interface 1108 can be accessed by the mobile OS 1114 using card emulation APIs 1116 without requiring the use of a secure element. In some embodiments, display 1107 can also be part of contactless interface 1108, and is used, for example, to perform transactions using QR codes, bar codes, etc.

Memory 1102 can be implemented using any combination of any number of non-volatile memories (e.g., flash memory) and volatile memories (e.g., DRAM, SRAM), or any other non-transitory storage medium, or a combination thereof media. Memory 1102 may store a mobile OS 1114 and a mobile application environment 1110 where one or more mobile applications reside including transaction application 1112 (e.g., mobile wallet application, mobile banking application, mobile payments application, merchant application, etc.) to be executed by processor 1105. In some embodiments, mobile OS 1114 may implement a set of card emulation APIs 1116 that can be invoked by transaction application 1112 to access contactless interface 1108 to interact with an access device.

According to some embodiments, transaction application 1112 can include multiple software layers. For example, transaction application 1112 may include a first software layer 1120 (e.g., SDK) and a second software layer 1130 (e.g., NDK). The first software layer 1120 may include a set of public APIs that is used to implement non-security sensitive functions such user interface functions, networking or communications functions, as well as functions that may invoke security-sensitive functions implemented in the second software layer 1130. The first software layer 1120 can be written in a high level programming language such as Java. The second software layer 1130 may include a native library to implement security-sensitive functions such as token request function 1134, account parameters replenishment function 1136, cryptogram generation function 1138, etc. The second software layer 1130 may be written in a low level programming language such as C or C++.

In some embodiments, the some or all of the application 122 software can be provided via a software development kit (SDK). Additionally, an SDK can include a layer that is secured based on guards, obfuscation, and cryptographic whiteboxing. This secure layer can be referred to as a whiteboxed layer.

Token request function 1134 can be invoked to request a token from a remote server (e.g., CBP, or issuer or host processing system). The token can be used as a substitute for a real account identifier to conduct transactions, for example, by sending the token to an access device. Using a token instead of a real account identifier can be more secure because the real account identifier is not transmitted when conducting a transaction. Token request function 1134 can be invoked, for example, at enrollment time to request an initial token, or when the lifespan of the current token has expired.

Account parameters replenishment function 1136 can be invoked to replenish or renew account parameters such as a limited-use key from a remote server (e.g., CBP, or issuer or host processing system). At the time of a transaction, the limited-use key is used to generate a transaction cryptogram that is provided to an access device to conduct the transaction. The limited-use key may be associated with a set or one or more limited-use thresholds (e.g., valid for a predetermined period of time, predetermined number of transactions, and/or predetermined cumulative transaction amount) to limit the usage of the LUK. When one or more of the limited-use thresholds of the LUK has expired or is about to expire, account parameters replenishment function 1136 can be invoked to request a new LUK Cryptogram generation function 1138 can be invoked at transaction time to generate a transaction cryptogram that is provided to an access device to conduct the transaction. The transaction cryptogram can be generated by receiving dynamic transaction data from the access device (e.g., transaction amount, transaction date, unpredictable number, etc.), and encrypting the dynamic transaction data with the LUK. In some embodiments, the transaction cryptogram can be generate by encrypting a static string instead with the LUK (e.g., if the access device does not support transmission of dynamic data to the portable communication device).

According to some embodiments, a keystore 1133 can serve to centrally and securely store encryption and/or decryption keys and restrict access to sensitive functions such that only authorized applications can access the data and functionality.

In some embodiments, the memory 1102 and/or mobile OS 1114 can also include a secure memory (e.g., a secure element). The keystore 1133 can be included in this secure memory instead of the applications environment 1110.

In some embodiments, security-sensitive data and functions implemented by the keystore 1133 can be protected from malicious code using the software module binding and authentication techniques described herein. When the transaction application 1112 (e.g., the SDK 1120) invokes these functions in the keystore 1133, the keystore 1133 can authenticate that transaction application 1112 is authorized to use these functions by confirming there is a binding between the transaction application 1112 and the keystore 1133.

Although the description above may have described the software module binding and authentication techniques for use between an application and a keystore, it should be understood that the techniques can be used to protect functions implemented by any software module, secure data module, operating system, etc.

Additionally, some embodiments of the invention can also include user authentication. For example, before the application 122 proceeds with any of the methods described above, the application 122 can first perform a user authentication procedure, such as obtaining and verifying a password, PIN, biometric data, etc. In further embodiments, this user authentication information can be verified by the keystore 133 (e.g., using a secure keystore processor or memory).

Embodiments of the invention have a number of advantages. For example, in embodiments of the invention, binding can be established between two or more software modules, such that the software modules can authenticate one another and securely communicate. The software modules can take the form of mobile applications, secure data storage modules, and/or any other suitable software elements.

As a result, a first software module can be reliably authenticated by a second software module when determining whether or not the first software module is permitted to access secure data or functionality. Thus, sensitive data and processes can be protected from inappropriate exposure and use.

Embodiments can further advantageously incorporate secure hardware, such that secure data can be protected at a hardware level, and binding is access privileges are maintained at a hardware level.

Embodiments can protect secure information through several security layers. For example, to access an encryption and/or decryption key at a keystore, a mobile application may need to possess a certain UID (or other application identifier) that is associated with the encryption and/or decryption key. The application may also need to prove its identity through application binding. This can involve possessing a valid challenge value for encrypting a message sent to the keystore to confirm the binding. This can also involve possessing the correct private key for decrypting a message including a new challenge value from the keystore. Thus, to obtain a key for obtaining an LUK for generating a cryptogram, an application can use at least these three specific and secret data elements, as well as possessing confidential messaging and key derivation algorithms.

Embodiments advantageously create a strong, fraud-resistant binding by using both symmetric keys and asymmetric keys. For example, each software module can prove its identity by creating a digital signature using its own private key. Also, messages sent between the first software module and second software module can be encrypted using a symmetric key. The symmetric key can be dynamic, changing for each interaction. For example, the symmetric key can generated based on a challenge value, and a new challenge value can be generated by the second software module and provided to the first software module during each interaction. Thus, the following interaction can use a new challenge value.

A computer system will now be described that may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (1/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Per using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method performed by a computing device comprising a processor, a first software module and a second software module, the method comprising:
    generating, by the first software module executed by the processor, a challenge request comprising data elements including a first software module identifier, wherein the first software module is a software development kit (SDK);
    encrypting, by the first software module, using a first challenge element, the data elements in the challenge request;
    providing, by the first software module, the challenge request including the encrypted data elements to the second software module;
    decrypting, by the second software module executed by the processor, the encrypted data elements in the challenge request, wherein the second software module is a keystore module;
    generating, by the second software module, a second challenge element;
    encrypting, by the second software module, the second challenge element;
    providing, by the second software module to the first software module, a challenge response including the encrypted second challenge element;
    decrypting, by the first software module, the encrypted second challenge element; and
    storing, by the first software module, the second challenge element.

2. The method of claim 1, further comprising:
    signing, by the second software module, the second challenge element using a private key of a second software module public-private key pair;
    providing, by the second software module, the signed second challenge element to the first software module; and
    verifying, by the first software module, the signed second challenge element using a public key of the second software module public-ptivate key pair.

3. The method of claim 1,
    wherein encrypting the second challenge element comprises using, by the second software module, the first challenge element to encrypt the second challenge element, and
    wherein decrypting the second challenge element comprises using, by the first software module, the first challenge element to decrypt the second challenge element.

4. The method of claim 1, wherein the data elements of the challenge request further comprise a version identifier for the first software module and an application-device identifier for the computing device.

5. The method of claim 1, further comprising:
    signing, by the first software module, the challenge request using a private key of a first software module public-private key pair; and
    verifying, by the second software module, the challenge request using a public key of the first software module public-private key pair.

6. The method of claim 1, wherein the first challenge element and the second challenge element are different random numbers.

7. The method of claim 1, further comprising:
    storing, by the second software module, the second challenge element.

8. The method of claim 1, further comprising:
    generating, by the second software module, a short lived certificate, wherein the short lived certificate is present in the challenge response.

9. The method of claim 1, wherein the keystore module stores keys used to decrypt keys for generating cryptograms.

10. The method according to claim 9, wherein the keystore module is configured to receive and enforce restrictions regarding key usage and regarding entities authorized to use the keys.

11. The method according to claim 1, wherein the software development kit (SDK) comprises an SDK version identifier.

12. The method according to claim 1, wherein the SDK comprises a secure whiteboxed layer that is secured based on guards, obfuscation, and cryptographic whiteboxing.

13. A computing device comprising:
    a processor;
    a non-transitory computer readable medium comprising a first software module and a second software module, the non-transitory computer readable medium comprising code executable by the processor to implement a method comprising:
        generating, by the first software module, a challenge request comprising data elements including a first software module identifier and a time period, wherein the first software module is a software development kit (SDK);
        encrypting, by the first software module, using a first challenge element, the data elements in the challenge request;
        providing, by the first software module, the challenge request including the encrypted data elements to the second software module, wherein the second software module is a kevstore module;
        decrypting, by the second software module, the data elements in the challenge request;
        verifying, by the second software module, the data elements;
        generating, by the second software module, a second challenge element;
        encrypting, by the second software module, the second challenge element;
        providing, by the second software module to the first software module, a challenge response including the encrypted second challenge element;

decrypting, by the first software module, the encrypted second challenge element; and storing, by the first software module, the second challenge element.

14. The computing device of claim 13, wherein the method further comprises:

signing, by the second software module, the second challenge element using a private key of a second software module public-private key pair;

providing, by the second software module, the signed second challenge element to the first software module; and verifying, by the first software module, the signed second challenge element using a public key of the second software module public-private key pair.

15. The computing device of claim 13, wherein encrypting the second challenge element comprises using, by the second software module; the first challenge element to encrypt the second challenge element, and wherein decrypting the second challenge element comprises using, by the first software module, the first challenge element to decrypt the second challenge element.

16. The computing device of claim 13, wherein the data elements of the challenge request further comprise a version identifier for the first software module and an application-device identifier for the computing device.

17. The computing device of claim 13, wherein the method further comprises:

signing, by the first software module, the challenge: request using a private key of a first software module public-private key pair; and verifying, by the second software module, the challenge request using a public key of the first software module public-private key pair.

18. The computing device of claim 13, wherein the computing device is a distributed computing system.

19. The computing device of claim 13, further comprising a secure memory for storing encryption and/or decryption keys.

20. The computing device of claim 19, wherein the computing device is a mobile phone, and the computing device further comprises a near field communication element, which is configured to transmit a cryptogram generated using a key decrypted using another key in the keystore module.

* * * * *